(12) United States Patent
Lagudu et al.

(10) Patent No.: US 11,409,840 B2
(45) Date of Patent: Aug. 9, 2022

(54) DYNAMICALLY ADAPTABLE ARRAYS FOR VECTOR AND MATRIX OPERATIONS

(71) Applicant: ADVANCED MICRO DEVICES, INC., Santa Clara, CA (US)

(72) Inventors: Sateesh Lagudu, Hyderabad (IN);
Allen H. Rush, Santa Clara, CA (US);
Michael Mantor, Orlando, FL (US);
Arun Vaidyanathan Ananthanarayan, Hyderabad (IN); Prasad Nagabhushanamgari, Hyderabad (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 133 days.

(21) Appl. No.: 17/032,314

(22) Filed: Sep. 25, 2020

(65) Prior Publication Data

US 2022/0100813 A1    Mar. 31, 2022

(51) Int. Cl.
*G06F 17/16*     (2006.01)
*G06F 13/28*     (2006.01)
(52) U.S. Cl.
CPC .............. *G06F 17/16* (2013.01); *G06F 13/28* (2013.01)

(58) Field of Classification Search
CPC .................................. G06F 16/17; G06F 13/28
USPC .......................................................... 708/520
See application file for complete search history.

(56) References Cited

U.S. PATENT DOCUMENTS 11,200,060 B1 *  12/2021  Lagudu .............. G06F 9/30145
2021/0173893 A1 *  6/2021  Luo .................... G11C 13/0069

* cited by examiner

*Primary Examiner* — Tan V Mai

(57) ABSTRACT

An array processor includes processor element arrays distributed in rows and columns. The processor element arrays perform operations on parameter values. The array processor also includes memory interfaces that are dynamically mapped to mutually exclusive subsets of the rows and columns of the processor element arrays based on dimensions of matrices that provide the parameter values to the processor element arrays. In some cases, the processor element arrays are vector arithmetic logic unit (ALU) processors and the memory interfaces are direct memory access (DMA) engines. The rows of the processor element arrays in the subsets are mutually exclusive to the rows in the other subsets and the columns of the processor element arrays in the subsets are mutually exclusive to the columns in the other subsets. The matrices can be symmetric or asymmetric, e.g., one of the matrices can be a vector having a single column.

20 Claims, 8 Drawing Sheets

DYNAMICALLY ADAPTABLE ARRAYS FOR VECTOR AND MATRIX OPERATIONS

BACKGROUND

Graphics processing units (GPUs) and other multi-threaded processing units typically implement multiple processing elements (which are also referred to as processor cores or compute units) that concurrently execute multiple instances of a single program on multiple data sets. For example, the processing elements can implement single-instruction-multiple-data (SIMD) protocols to concurrently execute the same instruction on multiple data sets using multiple processor cores. The processing elements are therefore referred to as SIMD units. A hierarchical execution model is used to match the hierarchy implemented in hardware. The execution model defines a kernel of instructions that are executed by all the waves (also referred to as wavefronts, threads, streams, or work items). In some cases, the processing power of the GPUs or other multithreaded processing units implemented in a processing system is supplemented with one or more accelerators that also implement SIMD protocols. One example of an accelerator circuit that is implemented in conjunction with GPUs or other multithreaded processing units is an array processor.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
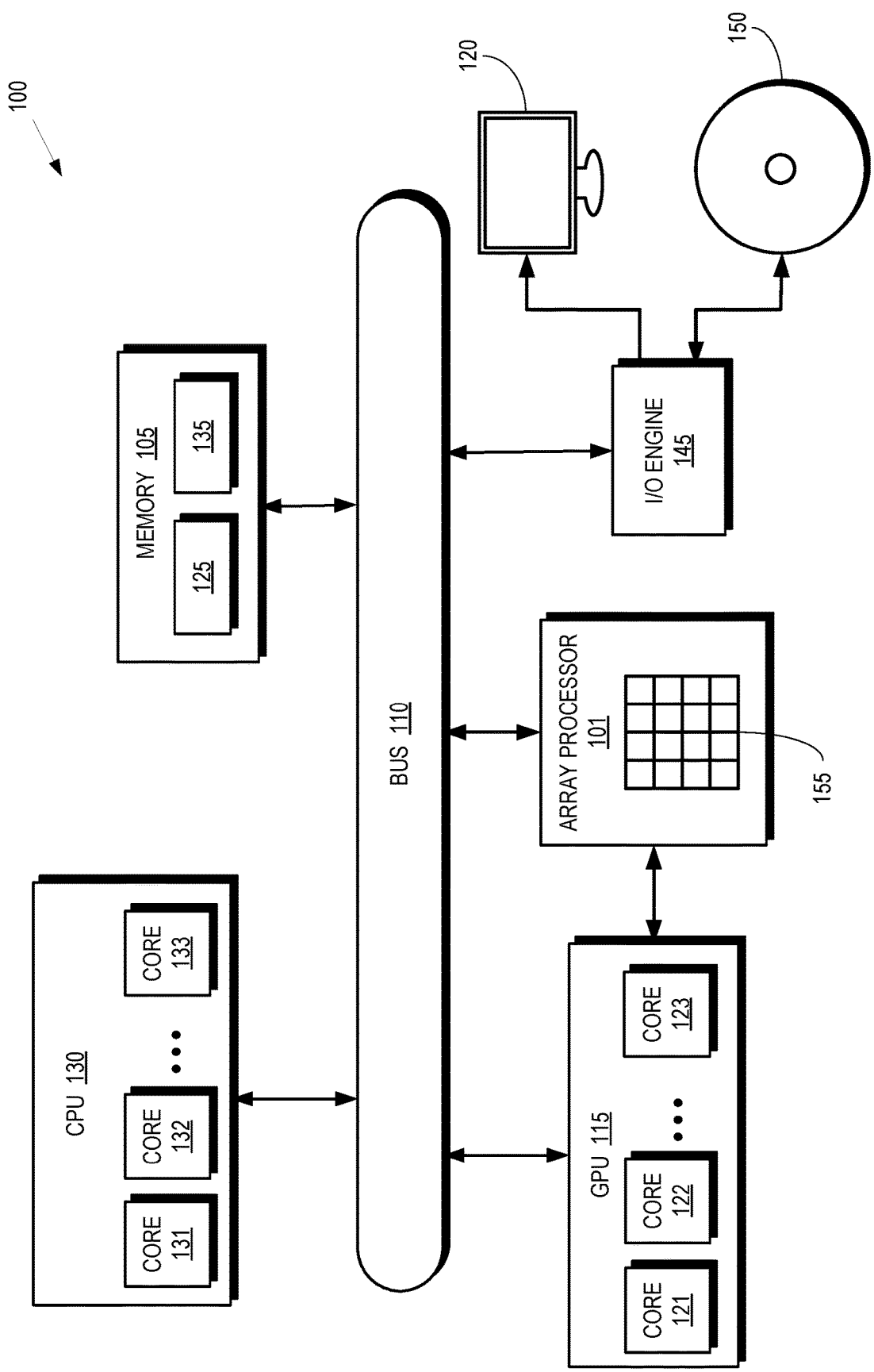
FIG. 1 is a block diagram of a processing system that implements dynamically adaptable arrays for vector and matrix operations using an array processor according to some embodiments.

An array processor system includes one or more workgroup processors (WGPs) that include a set of SIMD units. For example, an array processor can include four WGP that each implement four SIMD units. A SIMD unit includes a set of processor element arrays that perform vector operations such as multiply-accumulate operations on vectors or matrices. For example, a SIMD unit can include four processor element arrays in each of the processor element arrays includes an 8×8 array of circuits to perform operations (such as multiply-accumulate operations) on a pair of input vectors. As used herein, the term "vector" can also refer to individual rows or columns of matrices. Furthermore, the term "matrix" refers generally to arrays of values including vectors, which are understood as 1×N matrices. Thus, the array processor system can perform a matrix multiplication on matrices having dimensions that correspond to the number of processor element arrays. For example, an array processor that includes four WGPs including four SIMD units made up of four processor element arrays can multiply 64×64 matrices.

Input values for the kernel operations performed by the processor element arrays are retrieved from memory by one or more direct memory access (DMA) engines via a memory fabric and the DMA engines write output values back to the memory via the memory fabric. For example, each of the four WGP can include a pair of DMA engines that fetch values for corresponding pairs of SIMD units. Many of the kernel operations performed on matrices by the array processor system reuse the same parameter values over and over. For example, a multiply-accumulate operation used to implement a machine learning application can reuse the same vector or matrix values several times when performing a vector or matrix multiplication. Repeatedly prefetching the same parameters consumes significant memory bandwidth in the array processor system and reduces the efficiency of the array processor system as the system becomes bandwidth limited. The prefetch bandwidth can be reduced using horizontal and vertical broadcasting into rows and columns of processor element arrays in the array processing system. However, applications including machine learning applications frequently operate on matrices that have irregular shapes, such as "long and skinny" matrices including a large number of rows and a single column (or small number of columns). Simply broadcasting values to the processor element arrays would result in values being unnecessarily provided to processor element arrays that are not performing any operations, which reduces the efficiency of the array processor system.

FIGS. 1-8 disclose embodiments of an array processor system that efficiently allocates resources to perform kernel operations on different sizes of matrices by dynamically allocating subsets of processor element arrays in the array processor system based on dimensions of the matrices. A set of direct memory access (DMA) engines are configured to broadcast parameter values read from a memory via a memory fabric to corresponding rows (horizontal broadcasting) and columns (vertical broadcasting). Subsets of the DMA engines are selectively mapped to the subsets of the processor element arrays based on the dimensions of the matrices that are involved in the kernel operations being performed by the array processor system. The rows of processor element arrays in each subset are mutually exclusive to the rows in the other subsets and the columns of processor element arrays in each subset are mutually exclusive to the columns in the other subsets.

In some embodiments, the subsets of the processor element arrays perform kernel processing on square matrices, i.e., matrices that have the same vertical and horizontal dimensions. The subsets of the DMA engines are then mapped to corresponding symmetric subsets of the processor element arrays. For example, if the array processor system includes eight compute units of eight processor element arrays (e.g., two processor element arrays per SIMD unit in the compute unit), eight DMA engines are mapped to corresponding ones of the eight rows and eight columns of the array processor system to multiply values representing two 64×64 matrices that are retrieved by the DMA engines. Concurrent multiplication of 32×32 matrices is performed by mapping a first subset including four of the eight DMA engines to a first subset including four rows and four columns of the array processor system and mapping a second subset including another four of the eight DMA engines to a second subset including four rows and four columns of the array processor system that are mutually exclusive to the rows and columns in the first subset. In some embodiments, additional mappings are used to map subsets of the DMA engines to mutually exclusive row/column subsets so that concurrent operations are performed on matrices of other sizes including 16×16, 8×8, 4×4, and the like.

The subsets of the processor element arrays also perform kernel processing on matrices that do not have the same vertical and horizontal dimensions. In some embodiments, at least one dimension of the matrices is larger than the dimensions of the array processor system. In that case, each processor element array is associated with multiple accumulators. For example, if the array processor system includes eight compute units of eight processor element arrays and each processor element array is associated with a pair of accumulators, the array processor system can multiply a 128×64 matrix with a 64×128 matrix to produce a 128×128 matrix, which is referred to herein as (128, 128, 64) kernel processing. Subsets of the processor element arrays (and corresponding accumulators) can be allocated to subsets of the DMA engines to perform kernel processing concurrently on smaller matrices, such as (64, 64, 32) kernel processing of two sets of matrices. Implementing multiple accumulators per processor element array allows the fetch time and compute time for kernel processing to be equal. In some embodiments, the processor element arrays in the array processor system are fully utilized for matrix-vector operations by mapping subsets of the matrix and the vector to different processor element arrays that generate partial sums from the values in the subsets. The partial sums are then combined to generate values of elements in the output vector.

FIG. 1 is a block diagram of a processing system 100 that implements dynamically adaptable arrays for vector and matrix operations using an array processor 101 according to some embodiments. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The GPU 115 renders images for presentation on a display 120. For example, the GPU 115 renders objects to produce values of pixels that are provided to the display 120, which uses the pixel values to display an image that represents the rendered objects. The GPU 115 implements a plurality of processor cores 121, 122, 123 (collectively referred to herein as "the processor cores 121-123") that execute instructions concurrently or in parallel. Some embodiments of the processor cores 121-123 operate as SIMD units that perform the same operation on different data sets. The number of processor cores 121-123 implemented in the GPU 115 is a matter of design choice and some embodiments of the GPU 115 include more or fewer processor cores than shown in FIG. 1. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. Some embodiments of the processor cores 131-133 operate as SIMD units that perform the same operation on different data sets. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

The array processor 101 supplements the processing power of the GPU 115 and, in some embodiments, the CPU 130. A set 155 of processor element arrays are used to perform operations that accelerate or improve the performance of the GPU 115 by allowing the GPU 115 to offload kernel operations or other tasks to one or more of the processor element arrays in the set 155. The processor element arrays then return results to the GPU 115. In some embodiments, the processor element arrays are implemented as vector arithmetic logic units (ALUs) that include circuitry to perform arithmetic and bitwise operations on integer binary numbers. The processor element arrays therefore receive one or more inputs (or operands) and generate corresponding outputs based on the operands and an opcode that indicates the operation that is performed by the processor element array. The operands, opcodes, and other status values are stored in registers associated with the processor element arrays.

The processor element arrays in the set 155 are distributed in rows and columns. As discussed below, the array processor 101 also includes memory interfaces that read parameter values (e.g., from the memory 105) and broadcast sets of the parameter values to mutually exclusive subsets of the rows and columns of the processor element arrays. The memory interfaces are dynamically mapped to mutually exclusive subsets of the rows and columns of the processor element arrays in the array processor 101 based on dimensions of the matrices that provide the parameter values to the processor element arrays. In some cases, the processor element arrays are vector arithmetic logic unit (ALU) processors and the memory interfaces are direct memory access (DMA) engines. The rows of the processor element arrays in the subsets are mutually exclusive to the rows in the other subsets and the columns of the processor element arrays in the subsets are mutually exclusive to the columns in the other subsets. The matrices can be symmetric or asymmetric, e.g., one of the matrices can be a vector having a single column.

Figure 2:
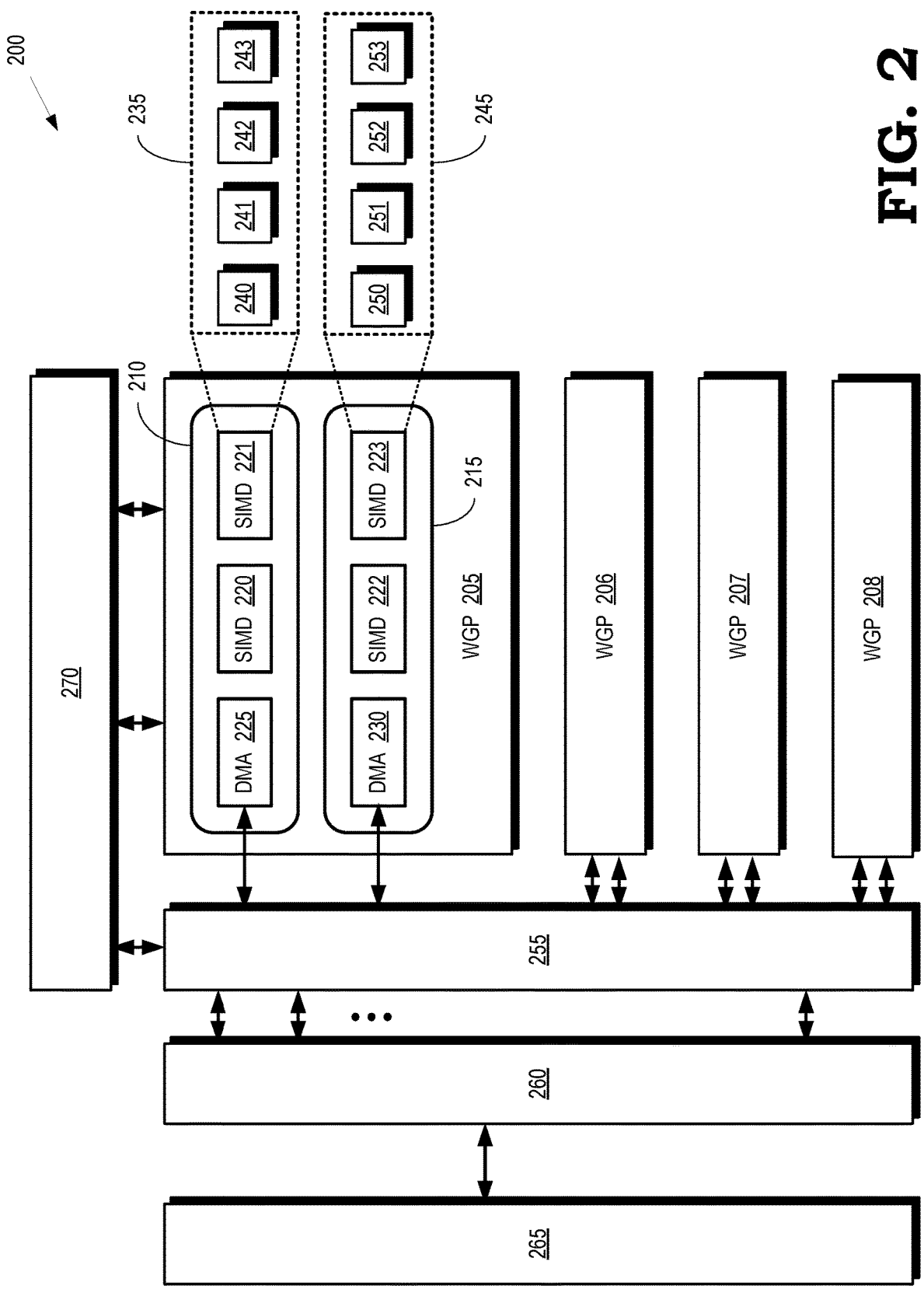
FIG. 2 is a block diagram of a portion of a processing system that implements dynamically adaptable arrays for vector and matrix operations using an array processor according to some embodiments.

FIG. 2 is a block diagram of a portion 200 of a processing system that implements dynamically adaptable arrays for vector and matrix operations using an array processor according to some embodiments. The portion 200 is used to implement some embodiments of the array processor 101 shown in FIG. 1. The portion 200 includes a set of WGPs 205, 206, 207, 208 (collectively referred to herein as "the WGPs 205-208") that implement pairs of compute units 210, 215. The compute units 210, 215 are only illustrated in the WGP 205 in the interest of clarity, although the WGPs 206-208 also include pairs of compute units. Some embodiments of the portion 200 implement more or fewer WGP and corresponding compute units.

The WGPs 205-208 include SIMD units 220, 221, 222, 223 (collectively referred to herein as "the SIMD units 220-223") and memory interfaces such as direct memory access (DMA) engines 225, 230. Some embodiments of the memory interfaces also include TA/TD logic and transmission control protocol (TCP) interfaces that operate in conjunction with the DMA engines 225, 230. Each of the SIMD units 220-223 implements a portion of a set of processor element arrays. In the illustrated embodiment, the SIMD unit 221 includes a subset 235 of processor element arrays 240, 241, 242, 243 (collectively referred to herein as "the processor element arrays 240-243") and the SIMD unit 223 includes a subset 245 of processor element arrays 250, 251, 252, 253 (collectively referred to herein as "the processor element arrays 250-253"). The SIMD units 220, 222 also include other subsets of processor element arrays that are not shown in FIG. 2 in the interest of clarity. The processor element arrays 240-243, 250-253 are sometimes referred to as "PEAs 240-243, 250-253."

The DMA engines 225, 230 are connected to a memory fabric 255 that provides one or more channels between the DMA engines 225, 230 and an SRAM 260. In the illustrated embodiment, the SRAM 260 is connected to a system memory 265 such as the memory 105 shown in FIG. 1. The portion 200 also includes an asynchronous compute engine 270 that communicates with the WGPs 205-208 and the memory fabric 255.

The DMA engines 225, 230 fetch parameter values from the SRAM 260 or the system memory 265 via the memory fabric 255. The fetched parameter values are then broadcast to mutually exclusive subsets of the processor element arrays including the processor element arrays 240-243, 250-253. In some embodiments, the DMA engines 225, 230 broadcast the parameter values to processor element arrays in corresponding rows and columns of the set of processor element arrays. For example, the DMA engine 225 can broadcast first parameter values to the processor element arrays in a first row (e.g., the row including the processor element arrays 240-243) and a first column (e.g., the column including the processor element arrays 240, 250). The DMA engine 230 can broadcast second parameter values to the processor element arrays in a second row (e.g., the processor element arrays 250-253) and a second column (e.g., the processor element arrays 241, 251). In this case, the subset of processor element arrays 240-243 and one row is mutually exclusive to the subset of the processor element arrays 250-253 in another row. The subset of processor element arrays in the column that includes the processor element arrays 240, 250 is mutually exclusive to the subset of processor element arrays in the column that includes the processor element arrays 241, 251. Thus, the DMA engines 225, 230 concurrently populate registers associated with the processor element arrays in the mutually exclusive subsets of the rows and columns with their corresponding fetched parameter values.

In some embodiments, subsets of the DMA engines 225, 230 are mapped to mutually exclusive subsets of the rows and columns of the processor element arrays 240-243, 250-253 based on dimensions of matrices that provide the parameter values to the processor element arrays 240-243, 250-253. Values of the elements in the matrices are stored in the SRAM 260 or the system memory 265 and the DMA engines 225, 230 fetch corresponding parameter values into the subsets that store values for the corresponding elements in the matrices. Some embodiments of the DMA engines 225, 230 are mapped to multiple subsets of the processor element arrays 240-243, 250-253 concurrently perform the kernel processing on multiple sets of matrices to generate multiple matrix outputs. The input matrices can be symmetric, e.g., two square matrices having the same vertical and horizontal dimensions, or asymmetric, e.g., the input matrices have different vertical and horizontal dimensions. In some embodiments, the processor element arrays 240-243, 250-253 are partitioned into a number of mutually exclusive subsets that is determined by how many processor element arrays 240-243, 250-253 are available, as well as the vertical and horizontal dimensions of the input matrices.

Figure 3:
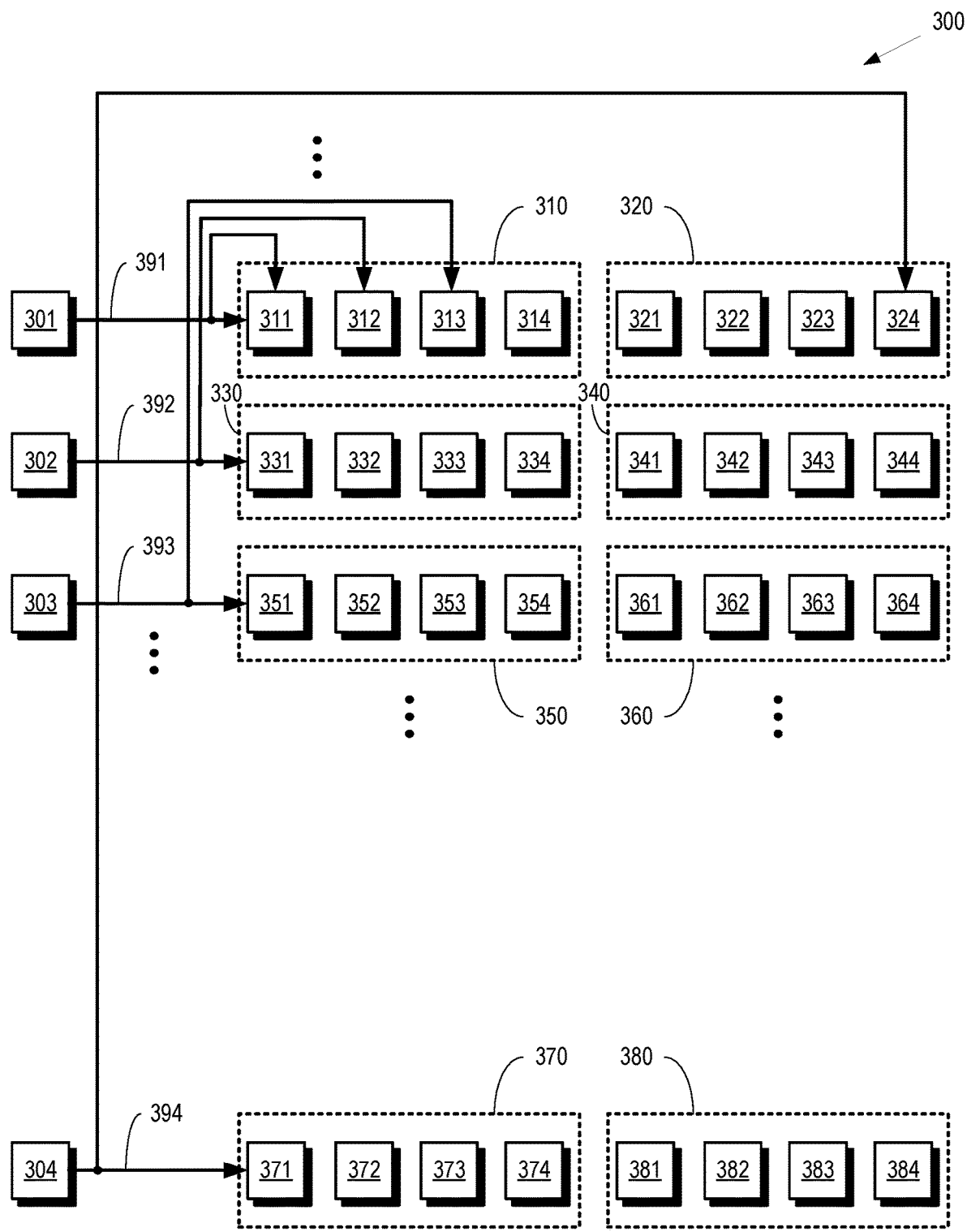
FIG. 3 is a block diagram of an array processor that implements dynamically adaptable arrays using memory interfaces that are mapped to different rows and columns of the array processor according to some embodiments.

FIG. 3 is a block diagram of an array processor 300 that implements dynamically adaptable arrays using memory interfaces that are mapped to different rows and columns of the array processor 300 according to some embodiments. The array processor 300 is used to implement some embodiments of the array processor 101 shown in FIG. 1. The array processor 300 includes DMA engines 301, 302, 303, 304 (collectively referred to herein as "the DMA engines 301-304") that fetch parameters from a memory such as the memory 105 shown in FIG. 1 or the memories 260, 265 shown in FIG. 2. The array processor 300 also includes SIMD units 310, 320, 330, 340, 350, 360, 370, 380 that are implemented using corresponding subsets of processor element arrays 311, 312, 313, 314, 321, 322, 323, 324, 331, 332, 333, 334, 341, 342, 343, 344, 351, 352, 353, 354, 361, 362, 363, 364, 371, 372, 373, 374, 381, 382, 383, and 384 (collectively referred to herein as "the processor element arrays 311-384" for the sake of brevity; the hyphen is therefore not intended to indicate a continuous sequence of numerals between 311 and 384). Some embodiments of the SIMD units 310, 320, 330, 340, 350, 360, 370, 380 are implemented in different WGPs. For example, a first WGP can implement the SIMD unit 310, 320, a second WGP can implement the SIMD units 330, 340, a third WGP can implement the SIMD units 350, 360, and a fourth WGP can implement the SIMD units 370, 380.

The DMA engines 301-304 are interconnected with mutually exclusive subsets of the processor element arrays 311-384. In the illustrated embodiment, the DMA engines 301-304 are interconnected to mutually exclusive rows and columns in the array of processor element arrays 311-384 using physical connections 391-394 that include wires, traces, and the like. The DMA engine 301 is connected to a row including the processor element arrays 311-314, 321-324 and a column including the processor element arrays 311, 331, 351, 371 by a physical connection 391. The DMA engine 301 can therefore broadcast parameter values fetched from the memory to the processor element arrays 311-314, 321-324, the processor element arrays 311, 331, 351, 371, subsets of these processor element arrays, or a combination thereof. The DMA engine 302 is connected to a row including the processor element arrays 331-334, 341-344 and a column including the processor element arrays 312, 332, 352, 372 by a physical connection 392. The DMA engine 302 can therefore broadcast parameter values fetched from the memory to the processor element arrays 331-334, 341-344, the processor element arrays 312, 332, 352, 372, subsets of these processor element arrays, or a combination thereof. The DMA engine 303 is connected to a row including the processor element arrays 351-354, 361-364 and a column including the processor element arrays 313, 333, 353, 373 by a physical connection 393. The DMA engine 303 can therefore broadcast parameter values fetched from the memory to the processor element arrays 351-354, 361-364, the processor element arrays 313, 333, 353, 373, subsets of these processor element arrays, or a combination thereof. The DMA engine 304 is connected to a row including the processor element arrays 371-374, 381-384 and a column including the processor element arrays 324, 344, 364, 384 by a physical connection 394. The DMA engine 304 can therefore broadcast parameter values fetched from the memory to the processor element arrays 371-374, 381-384, the processor element arrays 324, 344, 364, 384, subsets of these processor element arrays, or a combination thereof.

Figure 4:
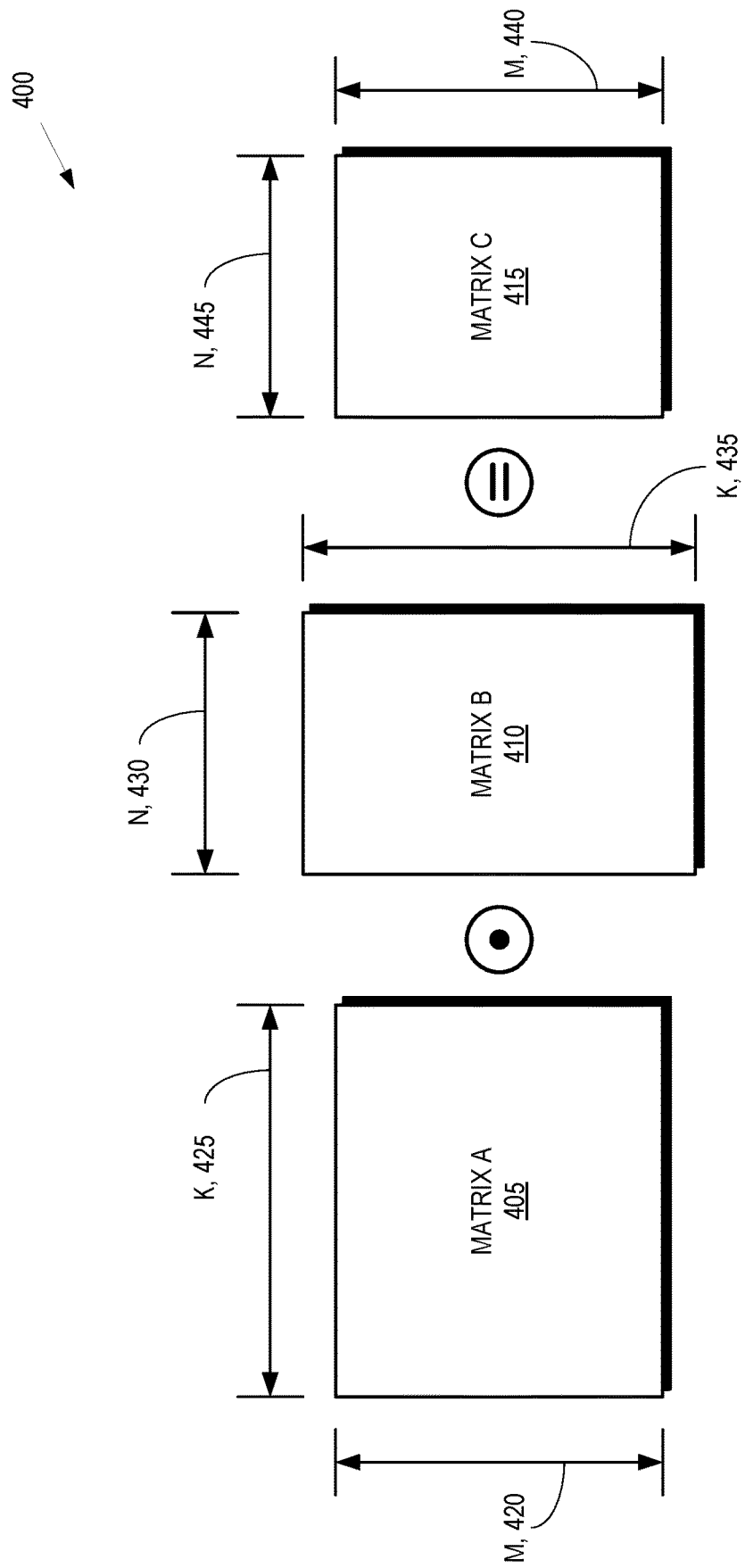
FIG. 4 is a block diagram of a matrix multiplication operation that is performed using processor element arrays of an array processor according to some embodiments.

FIG. 4 is a block diagram of a matrix multiplication operation 400 that is performed using processor element arrays of an array processor according to some embodiments. The matrix multiplication operation 400 is performed in some embodiments of the processing system 100 shown in FIG. 1, the portion 200 of the processing system shown in FIG. 2, and the array processor 300 shown in FIG. 3.

The matrix multiplication operation 400 multiplies matrix (A) 405 and matrix (B) 410 to form the matrix (C) 415. The matrices 405, 410 are referred to as the input matrices and the matrix 415 is referred to as the output matrix 415. The matrix 405 as a vertical dimension (M) 420 and a horizontal dimension (K) 425. The matrix 410 has a horizontal dimension (N) 430 and a vertical dimension (K) 435 that is equal to the horizontal dimension 425 of the matrix 405. The output matrix 415 as a vertical dimension (M) 440 that is equal to the vertical dimension 420 of the matrix 405 and a horizontal dimension (N) 445 that is equal to the horizontal dimension 430 of the matrix 410. The matrix multiplication operation 400 is represented as (M, N, K). For example, if M=128, N=128, and K=64, the matrix multiplication operation 400 is represented as (128, 128, 64).

In some embodiments, the matrices 405, 410 have the same vertical dimensions 420, 435 and horizontal dimensions 425, 430, e.g., the matrices 405, 410 are square matrices having the same dimensions. The vertical dimension 440 of the matrix 415 is therefore equal to the vertical dimensions 420, 435 and the horizontal dimension 445 of the matrix 415 is equal to the horizontal dimensions 425, 430. In some embodiments, the matrices 405, 410 have different vertical dimensions 420, 435 and different horizontal dimensions 425, 430. For example, the matrix 410 can have a horizontal dimension 430 of one, e.g., the matrix 410 can represent a vector.

Figure 5:
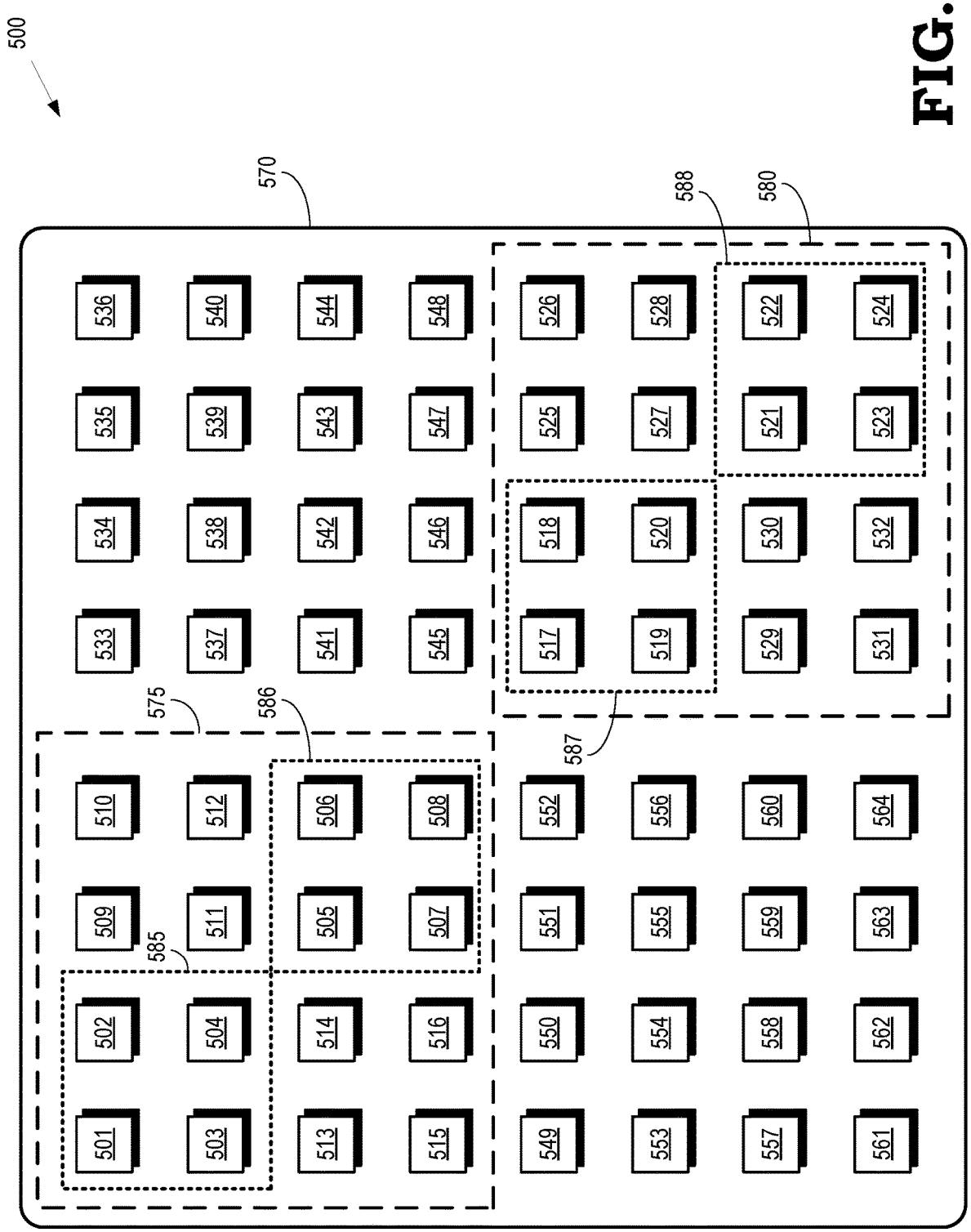
FIG. 5 is a block diagram of an array of processor element arrays that are dynamically allocated to perform vector and matrix operations according to some embodiments.

FIG. 5 is a block diagram of an array 500 of processor element arrays 501-564 that are dynamically allocated to perform vector and matrix operations according to some embodiments. The array 500 is implemented in some embodiments of the processing system 100 shown in FIG. 1, the portion 200 of the processing system shown in FIG. 2, and the array processor 300 shown in FIG. 3.

Subsets of the processor element arrays 501-564 are allocated to perform matrix operations based on dimensions of the input matrices. In the illustrated embodiment, the processor element arrays 501-564 are dynamically adapted to perform different matrix multiplications using mutually exclusive subsets of the processor element arrays 501-564. For example, the subset 570 that includes all the processor element arrays 501-564 can be allocated to perform a (64, 64, 64) matrix multiplication. For another example, the mutually exclusive subsets 575 and 580 (including the processor element arrays 501-516 and 517-532, respectively) can be allocated to perform two (32, 32, 32) matrix multiplications concurrently or in parallel. For yet another example, the mutually exclusive subsets 585, 586, 587, 588 (including the processor element arrays 501-504, 505-508, 517-520, and 521-524, respectively) can be allocated to perform four (16, 16, 16) matrix multiplications concurrently or in parallel. Although the mutually exclusive subsets 570, 575, 580, 585-588 shown in FIG. 5 are symmetric and have the same horizontal and vertical dimensions, other mutually exclusive subsets that do not have the same horizontal and vertical dimensions are used in other embodiments.

Figure 6:
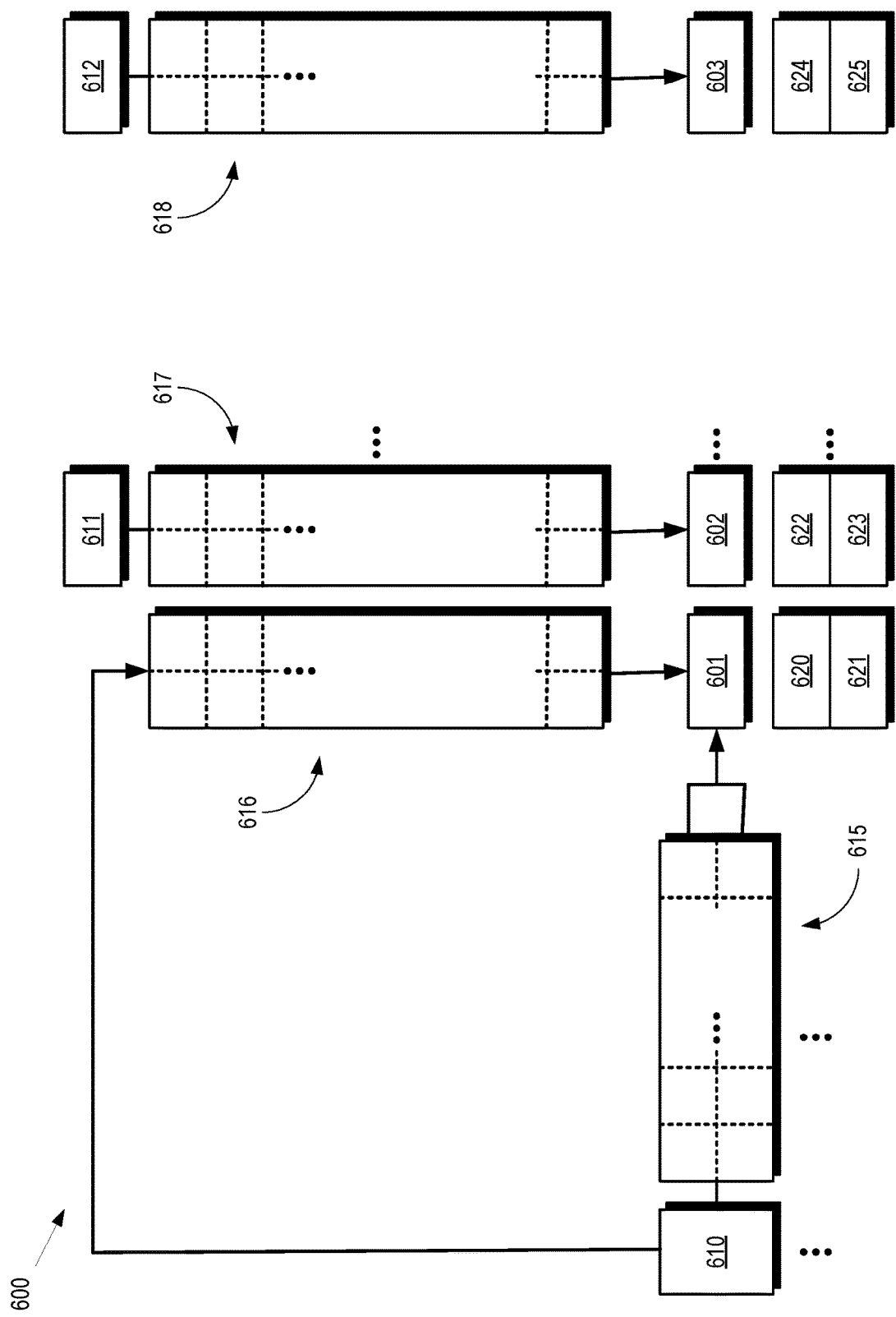
FIG. 6 is a block diagram of an array of processor element arrays that perform kernel operations on matrices having different vertical and horizontal dimensions according to some embodiments.

FIG. 6 is a block diagram of an array 600 of processor element arrays 601-603 that perform kernel operations on matrices having different vertical and horizontal dimensions according to some embodiments. The array 600 is implemented in some embodiments of the processing system 100 shown in FIG. 1, the portion 200 of the processing system shown in FIG. 2, and the array processor 300 shown in FIG. 3. In the illustrated embodiment, the processor element arrays 601-608 are vector signal processors that perform the kernel operations.

The array 600 also includes (or is associated with) memory interfaces 610, 611, 612, which are collectively referred to herein as "the memory interfaces 610-612." Some embodiments of the memory interfaces 610-612 are implemented as DMA engines. The memory interfaces 610-612 fetch values of elements of matrices and provide them to mutually exclusive sets of registers or buffers 615, 616, 617, 618, which are collectively referred to herein as "the buffers 615-618." In the illustrated embodiment, the memory interface 610 is mapped to the buffer 615 (which can be referred to as a row buffer) and the buffer 616 (which can be referred to as a column buffer). The memory interface 611 is mapped to the buffer 617 and the memory interface 612 is mapped to the buffer 618. Although not shown in FIG. 6 in the interest of clarity, the memory interfaces 611, 612 are mapped to corresponding row buffers.

The buffers 615-618 are partitioned into multiple portions that are allocated to store values of different elements of a matrix or elements of different matrices. The memory interfaces 610-612 can therefore fetch values of different elements into different portions of the buffers 615-618 in consecutive cycles or sets of cycles. In the illustrated embodiment, the buffers 615-618 are partitioned into two portions so that the interfaces 610-615 alternately fetch elements from two different portions of a matrix or two different matrices into the two partitions of the buffers 615-618. Values from the different partitions of the buffers 615-618 are sequentially provided to the processor element arrays 601-603, which perform kernel operations on the provided values.

The processor element arrays 601-603 are associated with multiple accumulators 620-625 that separately and independently accumulate values for the different matrix portions that are provided to the different partitions of the buffers 615-618. For example, the accumulator 620 can accumulate partial sums generated by the processor element array 601 using values stored in first partitions of the buffers 615, 616 and the accumulator 621 can accumulate partial sums generated by the processor element array 601 using value stored in second partitions of the buffers 615, 616. Associating multiple accumulators 620-625 with each of the processor element arrays 601-603 allows the array 600 to process matrices having dimensions larger than the numbers of processor element arrays 601-603. For example, a 64×64 array 600 such as the array 500 shown in FIG. 5 can perform a (128, 128, 64) kernel operation by allocating subsets of the 128 rows of one of the input matrices to different partitions in the row buffers (such as the row buffer 615) and allocating subsets of the 128 columns of the other input matrix to different partitions in the column buffers (such as the column buffers 616-618). Accumulating the partial sums for the different subsets of rows and columns in the accumulators 620-625 allows the array 600 to maintain a fetch time that is equal to a compute time, thereby avoiding bottlenecks in the processing.

Figure 7:
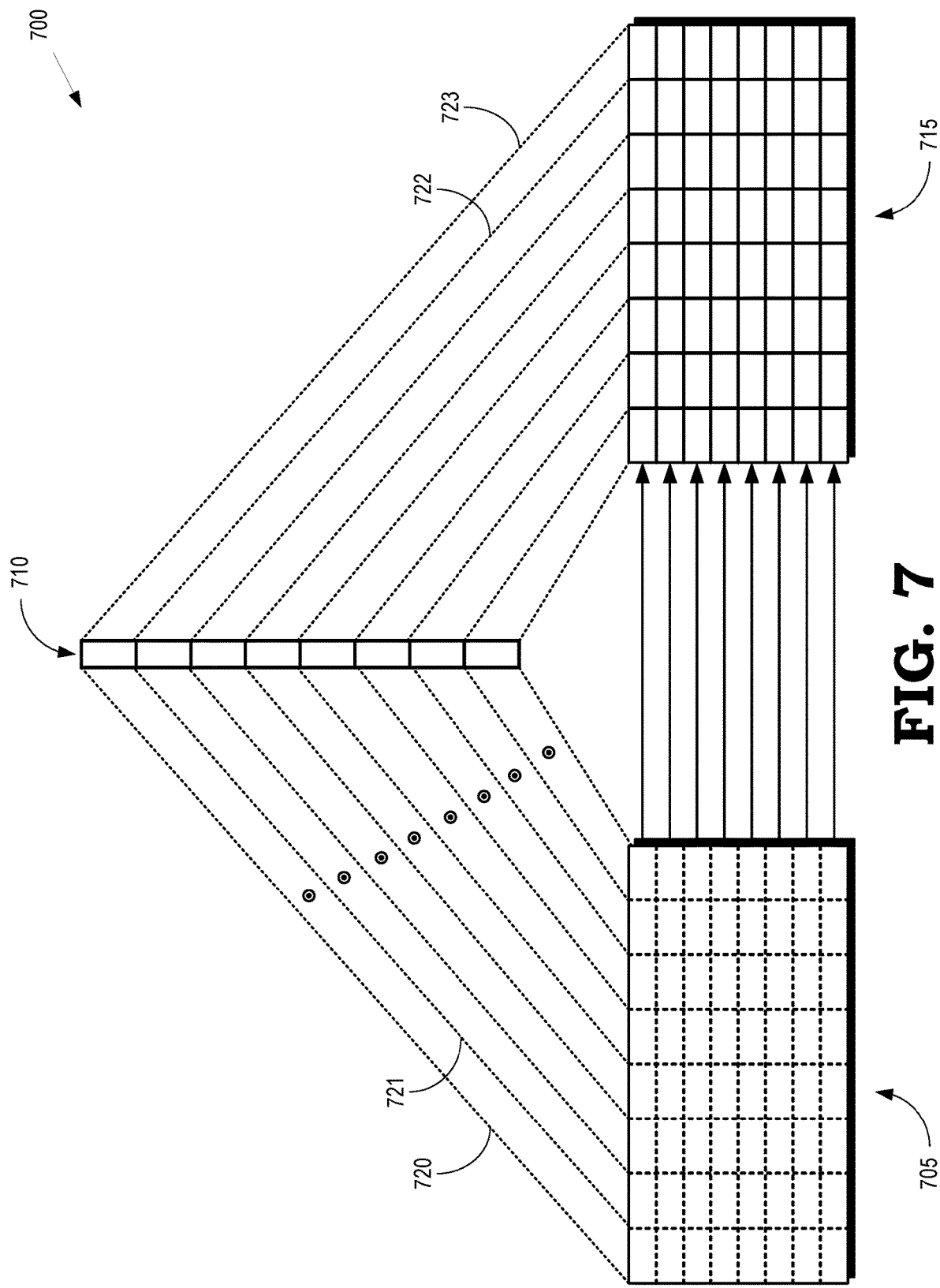
FIG. 7 is a block diagram of a mapping of a matrix-vector operation to processor element arrays that perform kernel operations on matrices having different vertical and horizontal dimensions according to some embodiments.

FIG. 7 is a block diagram of a mapping 700 of a matrix-vector operation to processor element arrays that perform kernel operations on matrices having different vertical and horizontal dimensions according to some embodiments. The mapping 700 is implemented in some embodiments of the processing system 100 shown in FIG. 1, the portion 200 of the processing system shown in FIG. 2, and the array processor 300 shown in FIG. 3.

A set 705 of vector general-purpose registers (VGPRs) stores elements of the matrix that are to be multiplied with the elements of the vector. In the illustrated embodiment, the set 705 includes eight rows corresponding to rows of the input matrix and eight blocks that each include eight elements from corresponding columns of the input matrix. Another set 710 of VGPRs stores elements of the vector in a single column of blocks that each include eight elements from corresponding rows of the input vector. The mapping 700 maps the blocks in the set 705 and the blocks in the set 710 to vector signal processors (VSPs) in an 8×8 array 715. For example, the dotted lines 720, 721, 722, 723 indicate a mapping of a first column of blocks in the set 705 and first blocks in the set 710 to a corresponding column of VSPs in the array 715. Thus, the blocks in the set 705 and the blocks in the set 710 are mapped to the VSPs in the array 715 in a manner that supports full utilization of the VSPs, e.g., concurrent operation of all VSPs in the array 715.

Figure 8:
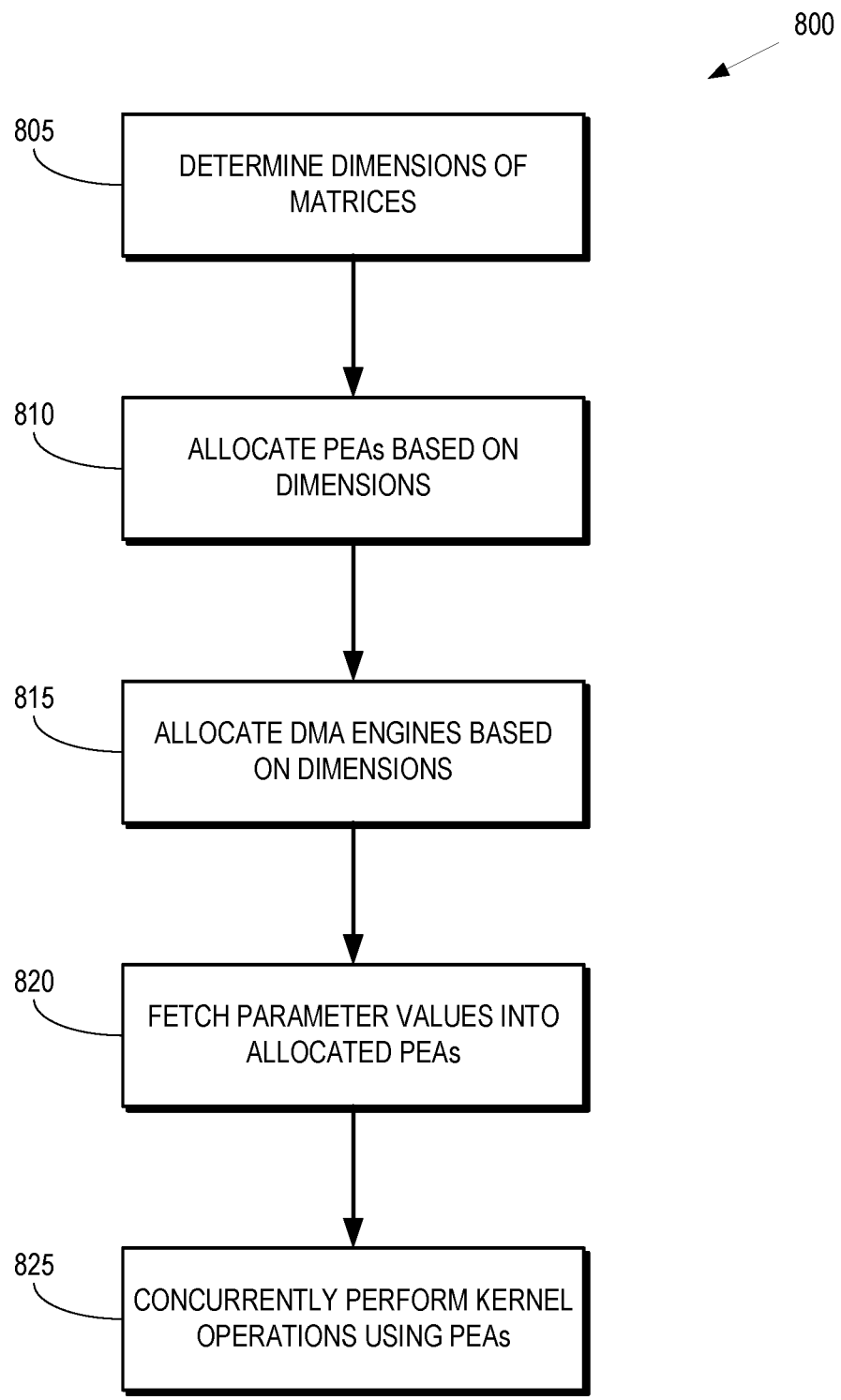
FIG. 8 is a flow diagram of a method of concurrently performing kernel operations on input matrices according to some embodiments.

FIG. 8 is a flow diagram of a method 800 of concurrently performing kernel operations on input matrices according to some embodiments. The method 800 is implemented in some embodiments of the processing system 100 shown in FIG. 1, the portion 200 of the processing system shown in FIG. 2, and the array processor 300 shown in FIG. 3.

At block 805, the processing system determines dimensions of the input matrices. In some embodiments, the processing system determines that the horizontal and vertical dimensions of the input matrices are the same, e.g., the matrices are square matrices having the same dimensions. In some embodiments, the processing system determines that the horizontal and vertical dimensions of the input matrices are different, e.g., the processing system determines that the kernel operation is a (M, N, K) where M is not necessarily equal to N, which is not necessarily equal to K.

At block 810, the processing system allocates processor element arrays to the kernel operations based on the dimensions of the input matrices. In some embodiments, substantially all the processor element arrays are allocated to the kernel operations, e.g., if the vertical or horizontal dimensions of the input matrices correspond to the number of processor element arrays in a row or column of an array processor. In some embodiments, kernel operations for multiple matrices are allocated to mutually exclusive subsets of the processor element arrays, e.g., if the vertical or horizontal dimensions of the input matrices are less than the number of processor element arrays in rows or columns of the array processor, as discussed herein with regard to FIG. 5.

At block 815, the processing system dynamically allocates memory interfaces, such as DMA engines, to fetch portions of the input matrices. The memory interfaces are allocated based on the dimensions of the input matrices and the memory interfaces fetch values of elements of the input matrices into mutually exclusive rows and columns of processor element arrays in the array processor.

At block 820, the memory interfaces fetch parameter values from a memory (such as the SRAM 260 or the system memory 265 shown in FIG. 2) and provide the fetch parameter values to the allocated processor element arrays. At block 825, the processor element arrays concurrently perform kernel operations on the input parameter values to generate output values, as discussed herein.

In some embodiments, the apparatus and techniques described above are implemented in a system including one or more integrated circuit (IC) devices (also referred to as integrated circuit packages or microchips), such as the array processor described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   processor element arrays distributed in rows and columns, wherein the processor element arrays are configured to perform operations on parameter values; and
   memory interfaces configured to be dynamically mapped to mutually exclusive subsets of the rows and columns of the processor element arrays based on dimensions of matrices that provide the parameter values to the processor element arrays.

2. The apparatus of claim 1, wherein the processor element arrays comprise vector arithmetic logic unit (ALU) processors, and wherein the memory interfaces comprise direct memory access (DMA) engines.

3. The apparatus of claim 1, wherein the rows of the processor element arrays in the subsets are mutually exclusive to the rows in the other subsets and the columns of the processor element arrays in the subsets are mutually exclusive to the columns in the other sub sets.

4. The apparatus of claim 1, wherein the processor element arrays are configured to perform kernel processing on square matrices that have equal vertical and horizontal dimensions.

5. The apparatus of claim 4, wherein the subsets of the memory interfaces are mapped to corresponding symmetric subsets of the processor element arrays.

6. The apparatus of claim 5, wherein multiple symmetric subsets of the processor element arrays concurrently perform the kernel processing on the square matrices.

7. The apparatus of claim 6, wherein a number of the symmetric subsets of the processor element arrays is determined by a number of the processor element arrays and the vertical and horizontal dimensions of the square matrices.

8. The apparatus of claim 1, wherein the processor element arrays are configured to perform kernel processing on matrices that have different vertical and horizontal dimensions.

9. The apparatus of claim 8, further comprising:
   a plurality of accumulators associated with the processor element arrays so that each of the processor element arrays is associated with more than one accumulator.

10. The apparatus of claim 9, wherein the processor element arrays are configured to perform kernel operations on a matrix and a vector, wherein portions of the matrix and the vector are mapped to different processor element arrays that generate partial sums from values in the portions, and wherein the partial sums are combined to generate values of elements in an output vector.

11. A method comprising:
    mapping memory interfaces to mutually exclusive subsets of rows and columns of processor element arrays based on dimensions of matrices that provide parameter values to the processor element arrays; and
    performing operations on the parameter values using the processor element arrays.

12. The method of claim 11, wherein the rows of the processor element arrays in the subsets are mutually exclusive to the rows in the other subsets and the columns of the processor element arrays in the subsets are mutually exclusive to the columns in the other sub sets.

13. The method of claim 11, further comprising:
determining at least one of a vertical dimension and a horizontal dimension of square matrices that provide the parameter values;
mapping the subsets of the memory interfaces to corresponding symmetric subsets of the processor element arrays; and
performing kernel processing on values of elements in the square matrices using the symmetric subsets of the processor element arrays.

14. The method of claim 13, further comprising:
concurrently performing the kernel processing on the values of the elements of the square matrices using multiple symmetric subsets of the processor element arrays.

15. The method of claim 14, further comprising:
determining a number of the symmetric subsets of the processor element arrays based on a number of the processor element arrays and the vertical and horizontal dimensions of the square matrices.

16. The method of claim 11, further comprising:
performing kernel processing on matrices that have different vertical and horizontal dimensions.

17. The method of claim 16, further comprising:
accumulating partial sums from kernel processing of elements of the matrices using a plurality of accumulators associated with the processor element arrays, wherein each processor element array is associated with more than one accumulator.

18. The method of claim 17, further comprising:
mapping portions of a matrix and a vector to different processor element arrays that generate partial sums from values in the portions;
performing kernel operations on the portions of the matrix and the vector to generate the partial sums; and
combining the partial sums to generate values of elements in an output vector.

19. A non-transitory computer readable medium embodying a set of executable instructions, the set of executable instructions to manipulate a computer system to perform a portion of a process to fabricate at least part of a processor, the processor comprising:
a component to map memory interfaces to mutually exclusive subsets of rows and columns of processor element arrays based on dimensions of matrices that provide parameter values to the processor element arrays; and
a component to perform operations on the parameter values using the processor element arrays.

20. The non-transitory computer readable medium of claim 19, wherein the processor further comprises:
a component to determine at least one of a vertical dimension and a horizontal dimension of matrices that provide the parameter values;
a component to map the subsets of the memory interfaces to corresponding subsets of the processor element arrays based on the at least one of the vertical dimension and the horizontal dimension; and
a component to perform kernel processing on values of elements in the matrices using the subsets of the processor element arrays.

* * * * *

UNITED STATES PATENT AND TRADEMARK OFFICE
CERTIFICATE OF CORRECTION

| | |
|---|---|
| PATENT NO. | : 11,409,840 B2 |
| APPLICATION NO. | : 17/032314 |
| DATED | : August 9, 2022 |
| INVENTOR(S) | : Sateesh Lagudu et al. |

It is certified that error appears in the above-identified patent and that said Letters Patent is hereby corrected as shown below:

In the Claims

At Column 12 Line 31, please replace "sub sets" after other with "subsets"

At Column 13 Line 5, please replace "sub sets" after other with "subsets"

Signed and Sealed this
Second Day of January, 2024

Katherine Kelly Vidal
*Director of the United States Patent and Trademark Office*